(No Model.)
J. WICH.
GRATER FOR CULINARY PURPOSES.
No. 486,058. Patented Nov. 8, 1892.
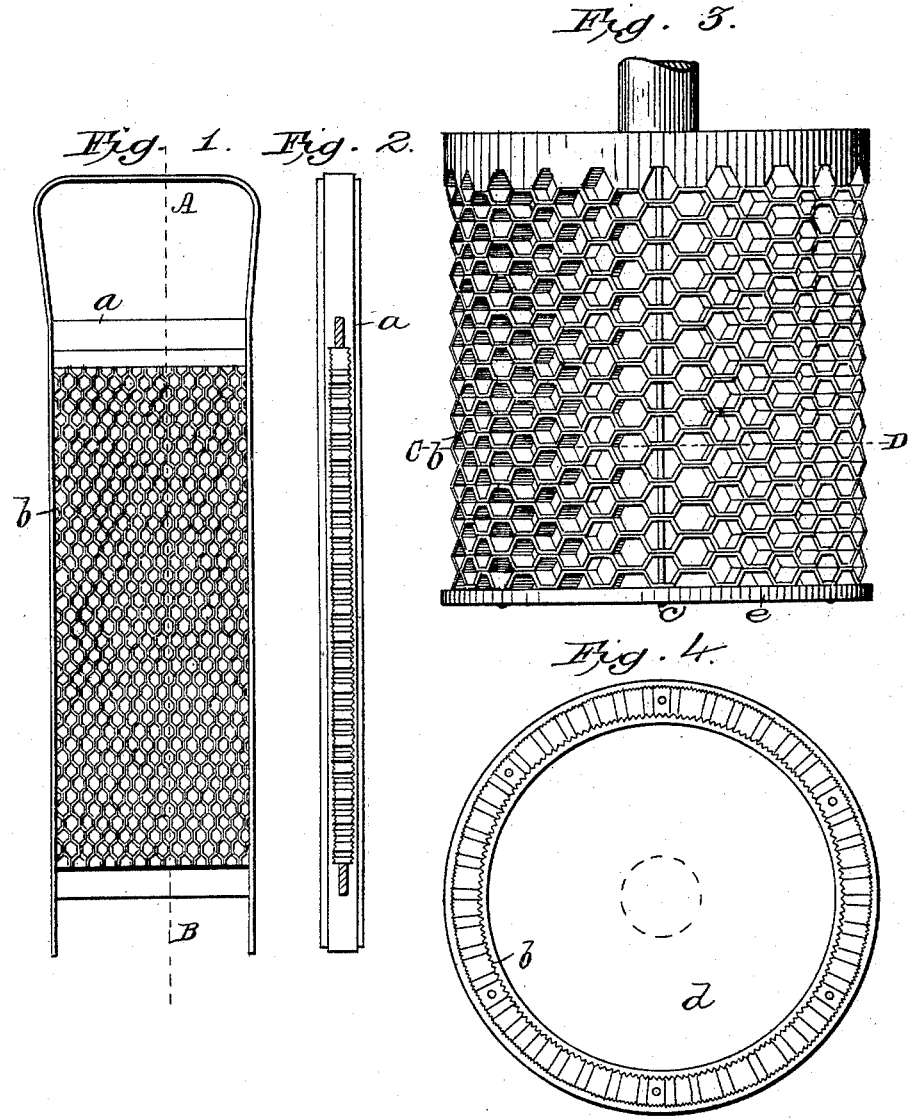

UNITED STATES PATENT OFFICE.

JOHANN WICH, OF ROTHENFELS, ASSIGNOR TO MAYER & GRAMMELSPACHER, OF BADEN, GERMANY.

GRATER FOR CULINARY PURPOSES.

SPECIFICATION forming part of Letters Patent No. 486,058, dated November 8, 1892.

Application filed April 4, 1892. Serial No. 427,734. (No model.) Patented in England March 10, 1890, No. 3,783 ; in Germany April 1, 1890, No. 51,386 ; in Austria-Hungary June 20, 1890, No. 11,548 and No. 26,200, and in Belgium October 24, 1890, No. 92,458.

*To all whom it may concern:*

Be it known that I, JOHANN WICH, a citizen of Baden, Germany, and a resident of Rothenfels, Baden, Germany, have invented certain new and useful Improvements in Graters, principally for culinary purposes, which have not been patented to me or to others with my knowledge or consent in any country except in Germany, No. 51,386, dated April 1, 1890; in England, No. 3,783, dated March 10, 1890; in Austria-Hungary, No. 11,548 and No. 26,200, dated June 20, 1890, and in Belgium, No. 92,458, dated October 24, 1890.

In the accompanying drawings I have represented what I consider the most preferable method of carrying out my invention.

In the drawings, Figure 1 represents a front elevation; Fig. 2, a section on the line A B, Fig. 1; Fig. 3, a side elevation of a modified form of grater embodying my invention, and Fig. 4 a transverse section thereof on line C D.

The same consists in a frame $a$, of sheet-iron, which may be provided with a handle and upright strips of sheet metal $b$, which are inserted in the frame and connected with each other in such a manner as to form a honeycomb-net of upright metal strips, Fig. 1. These strips $b$ are angularly undulating in form, as shown, and are serrated on both edges, and, preferably, in such a manner that fine serrations are arranged on one side and coarse serrations on the other, thereby producing a finer and coarser grating-surface. (See Fig. 2.) By this arrangement a network of loops or eyes is formed, which loops are separated from each other only by the thin walls formed by the sides of the strips.

In Figs. 3 and 4 I have shown the modification which differs from that first described, in that the strips $b$, forming the honeycomb-net, are arranged in the shape of a drum or cylinder, which drum is secured at one edge of the disk $d$, attached to a spindle $f$, by means of rods or wires $c$, passing longitudinally through the cylindrical net or drum. The other edge of the drum is secured to a flat iron ring $e$ by means of riveting or clinching the rods $c$ thereto. This apparatus is journaled in a suitable frame with its spindle $f$ and is caused to rotate by means of a crank which may be attached to the same. It is manifest that the net $b$ may be made in any other suitable or desirable shape instead of the flat or cylindrical shape.

The following advantages over the old forms of graters are attained by this new construction: I am enabled to provide the same with a large number of teeth on two sides, so that the work can be performed in a very expeditious manner. This new apparatus, moreover, has no dead-surfaces, as in the old constructions, but only teeth and openings, so that the matter to be comminuted is not prevented from passing through the grater and readily separates therefrom, an advantage which is of great importance when using such materials as potatoes, horse-radish, &c., which have a great tendency to adhere to the grater. The grater may, moreover, be very readily cleaned.

What I claim, and desire to secure by Letters Patent, is—

1. A grater provided with upright strips forming an open network of loops separated only by the thin walls formed by the sides of the strips, substantially as set forth.

2. A grater provided with upright serrated strips forming an open network of loops separated only by the thin walls formed by the sides of the strips, substantially as set forth.

3. A grater provided with upright strips forming a honeycombed network, the strips being provided with fine serrations on one edge and coarse serrations at the other edge, substantially as set forth.

In testimony that I claim the foregoing as my invention I have signed my name in presence of two subscribing witnesses.

JOH. WICH.

Witnesses:
 JACOB MAYER,
 JOSEPH GRAMMELSPACHER.